United States Patent Office 3,401,151
Patented Sept. 10, 1968

3,401,151
POLYURETHANES HAVING IMPROVED
DYEABILITY
Horst Wieden, Dormagen, Wilhelm Thoma, Cologne-Flittard, Harald Oertel, Leverkusen, Wolfgang Rollensmann, Dormagen, and Günther Nischk, Leverkusen, Germany, assignors to Farbenfabriken Bayer Aktiengesellschaft, Leverkusen, Germany, a corporation of Germany
No Drawing. Filed Oct. 15, 1965, Ser. No. 496,711
Claims priority, application Germany, Oct. 19, 1964, F 44,261
12 Claims. (Cl. 260—75)

ABSTRACT OF THE DISCLOSURE

Polyurethane elastic filaments are prepared by (1) reacting at a temperature below about 150° C (i) a substantially linear polyhydroxy compound having a molecular weight between about 800 and about 3,200 and a melting point below 60° C. with (ii) an excess of an organic diisocyanate to prepare an —NCO terminated prepolymer; (2) dissolving the prepolymer of step (1) in a solvent which will dissolve polyacrylonitrile and reacting said prepolymer at a temperature between about −10° C. and about 100° C. with from 80% to 130% based on the free —NCO groups in said prepolymer, with an extended system comprising (a) 50 to 98 mol percent of a difunctional chain extender having a molecular weight below about 500 and (b) 2 to 50 mol percent of a difunctional co-chain extender having the formula:

or an alkali metal salt thereof, wherein R is selected from the groups consisting of (i) a diphenylene-disulfonic acid group, (ii) a piperazine-di-N-alkylene group, (iii) an alkylene group having 2 to 8 carbon atoms, (iv) a

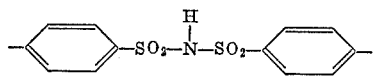

group, and, (v) an

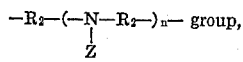

wherein $R_2$ is an alkylene group having 2 to 8 carbon atoms; wherein Z is selected from the group consisting of an alkyl group and an alkyl sulfonic acid group; wherein $n$ is an integer of 1 or 2; and wherein $R_1$ is selected from the group consisting of hydrogen, an alkyl-sulfonic acid group, and an alkyl group having 2 to 8 carbon atoms; to form a polyurethane, said (b) being present in such quantities such that the polyurethane contains between about 2 to 300 milliequivalents/kg. of polyurethane of —SO$_3^\ominus$ groups or —SO$_2$—N$^\ominus$—SO$_2$ groups; and (3) thereafter spinning said filament.

---

This invention relates to rubbery elastic polyurethane filaments and fibres improved dyeability for basic dyestuffs and to a process for the production of said rubbery elastic polyurethane filaments and fibres.

In recent years various processes have become known for the spinning of high molecular weight elastic addition products prepared by the isocyanate polyaddition process in a solvent medium into filaments or fibres. Polyhydroxyl compounds, e.g. linear or slightly branched hydroxyl group-containing polyesters, polyester amides, polyethers, polythioethers or polyacetals are reacted with an excess of aliphatic or aromatic diisocyanates so that preadducts having free isocyanate groups are first produced. These isocyanate modified polyhydroxyl compounds are then reacted in a solvent medium with low molecular weight bifunctional chain lengthening agents such as water, glycols, amino alcohols, diamines, dihydrazides or hydrazine.

High molecular weight solutions prepared by this process are then worked up into rubbery elastic filament or fibres by the various methods used in spinning. These filaments and fibres have the well-known advantageous properties of high tensile strength, low permanent elongation and high elastic modulus. On the other hand, they cannot be satisfactorily dyed with acid and basic dyestuffs. Dyeing of fibre mixtures of these elastic fibres and the usual synthetic fibres which can be dyed readily with acid or basic dyestuffs therefore cannot be carried out in a one vat process.

It is, however, known to improve the dyeability to acid dyestuffs by adding to the elastomer solutions, before the spinning process, basic components such as homopolymers of methacrylic acid (β-dimethylamino)-ethyl ester. From solutions prepared in this way it is then possible to obtain elastomer fibres which can be dyed together with synthetic fibres which can be dyed with acid dyes, e.g. polyamide fibres, even in a one vat process. However, the storage stability of such elastomer solutions in dimethylformamide is not very great and the viscosity of the spinning solution diminishes on prolonged storage. Moreover, filaments spun from such solution have a higher permanent elongation than filaments spun without addition of basic homopolymers.

Synthetic fibres which have good dyeability for basic dyestuffs, e.g., polyacrylonitrile fibres, are also known. It is therefore often desired to dye elastomer threads with basic dyestuffs and in some cases also to carry out the dyeing of elastomer fibre mixtures with the above mentioned synthetic fibres in a one vat process.

The present invention concerns the preparation of highly elastic filaments and fibres having good dyeability for basic dyestuffs and good elastic properties. In addition, the preparation of polyurethane fibres which can be dyed well both with acid and with basic dyestuffs is described.

The process of the invention for the preparation of polyurethane elastomer (solutions), which can be shaped into elastic, easily dyeable filaments or fibres, from high molecular weight, substantially linear polyhydroxyl compounds, diisocyanates and low molecular weight chain lengthening agents such as water, glycols, amino alcohols, hydrazine, diamines or dihydrazides, in which a substantially linear polyhydroxyl compound having an OH number of 35–120 is reacted with an excess of up to 300%, calculated on the hydroxyl groups present, of a diisocyanate below 150° C., if desired in the presence of low molecular weight dialcohols, and the reaction product is reacted, after dissolving it in a polar, organic solvent at −10 to +100° C., in a quantity of preferably 80 to 130%, calculated on the NCO groups still remaining in the reaction product, of low molecular weight chain lengthening agents, is characterised in that an acidic organic compound which contains sulphur and is bifunctional with respect to the isocyanate groups and which contains in the same molecule one or more sulphonic acid or disulphonimide groups or their alkali metal-, ammonium- or trialkylammonium salts is used as co-chain lengthening agent in a quantity of 2–50%, based on the free NCO groups in the NCO preadducts, in addition to the usual chain lengthening agents, such as water, glycols, aminoalcohols, diamines, hydrazines, dihydrazides as are described below.

It is an object of this invention to provide new synthetic polyurethane elastomers and filaments thereof having improved properties. In genereal, the linear polyurethane and the filaments thereof have an essential linear structure, comprising a segmented polyurethane from an NCO-prepolymer and a chain extending agent and 2 to 50 mol percent of a further chain extending agent consisting of a bifunctional compound containing at least one group of the formula —SO$_3$M or a sulfone imide group of the formula

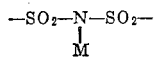

wherein M is hydrogen, an alkali metal or an ammonium group, said segmented polyurethane containing repeating units of the formula

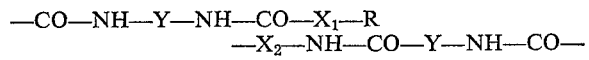

wherein Y is a bivalent aliphatic or aromatic radical, $X_1$ is oxygen or the NH-group, $X_2$ is oxygen or the group

wherein $R_1$ is hydrogen, the —SO$_3$M group and a $C_2$ to $C_8$-alkyl-SO$_3$M group and R is an arylene group having at least one —SO$_3$M group, the group of the formula

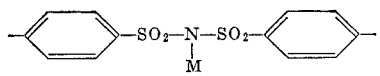

a piperazine —N,N'-bis-alkylene group and the group of the formula

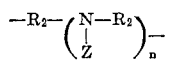

wherein $R_2$ is an alkylene group having 2 to 8 carbon atoms, Z an alkyl group and a $C_2$ to $C_8$-alkyl-SO$_3$M group and $n$ an integer from 0 to 2.

By reacting of the diisocyanates or the NCO-preadducts with the usual chain extending agents the following known structural units are formed:

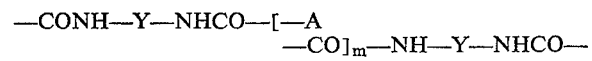

wherein Y has the meaning as given above, A the bivalent radical of the usual chain extending agent (hydrazine, diamines, diols, amino alcohols, dihydrazide compounds and water) and $m$ is an integer from 0 to 1. These structural units are linked with the linear polyhydroxy compounds, having a molecular weight of about 800 to about 3200.

To carry out the process, polyhydroxyl compounds having an OH number of 35 to 120, preferably 40 to 70, are reacted in known manner in the melt or in inert solvents such as methylene chloride, tetrahydrofuran, dioxane, benzene, chlorobenzene, if desired mixed with low molecular weight dialcohols such as butanediol, with excess aliphatic or aromatic diisocyanates below 150° C. The excess of diisocyanates may be up to 300% calculated on the hydroxyl groups present, so that the melt may contain free diisocyanate in addition to the isocyanate modified polyhydroxyl compound.

Suitable polyhydroxyl compounds are polyesters, polyester amides, polyethers, polythioethers and polyacetals which contain terminal hydroxyl groups and are substantially linear in structure. The melting point of these compounds should preferably be below 60° C. because otherwise the elastic properties of the end products are impaired, especially at low temperatures.

The linear hydroxyl group-containing polyesters used as starting materials can be prepared by condensation of dicarboxylic acids and diols at elevated temperature in known manner. The acid numbers are generally below 10, preferably between 0 and 3. Examples of suitable dicarboxylic acids for these polyesters are succinic acid, adipic acid, pimelic acid, azelaic acid, sebacic acid, thiodibutyric acid and sulphonyldibutyric acid. Suitable glycols include, for example, ethylene glycol, diethylene glycol, propane-1:2-diol, butane-1:4-diol, butane-1:3-diol, hexane-1:6-diol, hexahydro-p-xylyleneglycol, 2:2-dimethylpropane-1:3-diol as well as the alkoxylation products of the above compounds. Polyesters of lactones, e.g. ε-caprolactone, may also advantageously be used as starting materials.

In the same way, suitable polyester amides may be obtained by incorporating amino alcohols, such as ethanolamine, or propanolamines, or diamines such as hexamethylene diamine or piperazine, into polyesters.

Examples of suitable polyethers which may be mentioned include polyethylene glycol ether, polypropylene glycol ether and polytetramethylene glycol ether.

The polythioethers which can be used as starting compounds can be obtained in known manner from thiodiglycols and the polyacetals are obtained by reacting glycols with formaldehyde or from cyclic acetals.

Examples of suitable diisocyanates for the above mentioned reaction are p-phenylene diisocyanate, 1:5-naphthylenediisocyanate, 4:4' - diphenylmethanediisocyanate, 3:3' - dimethyl - 4:4' - diphenylmethanediisocyanate, 4:4' - diisocyanatestilbene, 4:4' - diisocyanate - dibenzyl, mixtures of 2:4- and 2:6-toluylene diisocyanate and hexamethylene diisocyanate. Especially suitable are diphenylmethane-4:4'-diisocyanate, the isomeric toluylene diisocyanates and hexamethylene diisocyanate.

The isocyanate-modified polyhydroxyl compounds with free isocyanate groups prepared in this way are then dissolved in solvents and reacted at −10 to 100° C., preferably 10 to 60° C., with low molecular weight chain lengthening agents having a molecular weight below about 500, preferably about 300, such as water, glycols, amino alcohols, diamines, dihydrazides or hydrazine. Depending on the choice of chain lengthening agent, quantities of 80 to 130% calculated on the free isocyanate groups still present in the reaction product are employed. At the same time, or separately, a compound which is bifunctional with respect to isocyanates and contains one or more sulphonic acid groups and/or disulphonimide groups, preferably in the form of their alkali metal, ammonium- or (tri)-alkylammonium salts, is added in quantities of 2 to 50 mols percent, preferably 5 to 25 mols percent, as co-chain lengthening agent in addition to the usual chain lengthening agents (98 to 50 mols percent, preferably 95 to 75 mols percent).

It is advantageous to add the lithium- or alkyl-ammonium salts in dissolved form to the reaction mixture, the solvent used being preferably chosen from the organic polyacrylonitrile solvents mentioned below.

In the chain lengthening reaction with aliphatic diamines, hydrazine or dihydrazides, some water may be added to these solvents to increase the solubility for alkali metal salts (e.g. Na salts) or the diamines or hydrazine may advantageously be reacted in the form of their CO$_2$ adducts with the NCO preadducts.

Organic, so-called "polyacrylonitrile solvents" such as dimethylformamide, dimethylacetamide, dimethylsulphoxide, dimethoxydimethylacetamide are used as solvents.

They must be free from constituents that are capable of reacting with diisocyanates. These highly polar solvents may contain further inert solvents such as dioxane, tetrahydrofuran or chlorobenzene in minor proportions of up to about 20% by weight.

Suitable chain lengthening agents apart from water include glycols such as p - phenylene - bis - $\beta$ - hydroxyethylether, 1:5 - naphthylene - bis - $\beta$ - hydroxyethylether, butane-1:4-diol, amino alcohols such as ethanolamine, diamines such as piperazine, ethylene diamine, N-methyl-propylene diamine, acid hydrazides such as carbodihydrazide, adipic acid dihydrazide, sebacic acid dihydrazide or hydrazine (hydrate).

The bifunctional co-chain extending agents having sulfonic acid groups or the corresponding alkali metal salt groups may be comprised by the following general formula:

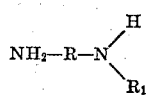

wherein R is the diphenylenedisulfonic acid group, a piperazine-di-N-alkylene group, an alkylene group with 2 to 8 carbon atoms, the group

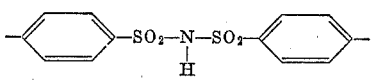

and the group

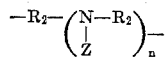

wherein $R_2$ is an alkylene group having 2 to 8 carbon atoms, Z an alkyl group and an alkyl sulfonic acid group and $n$ an integer from 1 to 2, $R_1$ hydrogen, an alkyl-sulfonic acid group, the alkyl group having 2 to 8 carbon atoms.

The bifunctional co-chain lengthening agents having sulphonic acid groups include, for example, diaminoarylsulphonic acids such as 4:4' - diaminodiphenyl - 2:2'-disulphonic acid, 4:4' - diaminostilbene - 2:2' - disulphonic acid, 4:4' - diamino - diphenylether - 2 - sulphonic acid and 2:4 - diaminobenzene sulphonic acid or N-sulphalkyl - alkylene diamines such as N-sulphobutyl-ethylenediamine, N - sulphobutyl - tetramethylene diamine, N-sulphobutyl - hexamethylenediamine, N:N' - bis- sulphobutyl - hexamethylenediamine and N - sulphopropyl-hexamethylene diamine. N - sulphobutyl - ethanolamine, N-sulphobutylhydrazine, N - sulphobutylcyclohexane - 1:4-diamine, 1:6 - hexamethylene - 3 - sulphonic acid, N-(4-sulphophenyl) - propylene diamine, N:N - bis - ($\beta$ - hydroxyethyl) - aminoethanesulphonic acid, N:N - bis - ($\beta$-hydroxypropyl)amino - ethane sulphonic acid and 4:4'-bis - semicarbazide-dihydrostilbene - 2:2' - disulphonic acid are also suitable as co-chain lengthening agents. Examples of disulphonic imide compounds are 4:4'-diaminodiphenyldisulphonimide, 4:4' - bis - (y - aminopropylamine)-diphenyldisulphonimide and 4:4-bis-($\beta$-hydroxypropyl)-diphenyldisulphonimide. The compounds are preferably used in the form of their alkali metal or alkyl-ammonium salts, the lithium or alkyl ammonium salts being especially suitable owing to their good solubility in the above mentioned solvents.

Depending on the choice of chain lengthening agents and reaction conditions, the reaction solutions reach a suitable viscosity for spinning after a shorter or longer length of time. Suitable processes for the preparation of elastomer solutions are described for example in U.S. Patent Specifications 129,964 and 306,271. To obtain sufficient dyeability with basic dyestuffs, the elastomers should have a content of the acid groups $SO_3^\ominus$ or $—SO_2N^\ominus—SO_2$ of about 2 to 300, preferably 10 to 125 milliequivalents of acid groups per kilogram of elastomer substance. The solutions which can be spun have good stability at room temperature or slightly elevated temperature. They are spun by the known spinning methods either dry, i.e. at elevated temperatures in air or inert gas, or wet, i.e. by injection into coagulation baths, to form elastic filaments or fibres. Rubbery elastic filaments or fibres are obtained which have good properties, i.e. high tensile strength, low permanent elongation, high modulus of elasticity. The good dyeability with basic dyestuffs is especially to be mentioned, because of which mixtures of fibres with synthetic fibres which can be dyed with basic dyes, for example polyacrylonitrile fibres, can easily be dyed in a one vat process.

Fibres which can only be dyed well with acid dyestuffs can also be dyed by the one vat process together with the elastomer fibres according to the invention which can be dyed with basic dyes, a good tone-in-tone dyeing being obtained if the dye bath contains both acid and basic dyestuffs.

The quality of being dyeable both with acid and with basic dyestuffs, which is desirable to enable the elastomer fibres to be universally applicable, can be achieved by means of the invention by so choosing the co-chain extending agents which have acid groups and are bifunctional with respect to NCO groups that they contain in the same molecule both sulphonic acid- and/or disulphimide groups (preferably in the form of their alkali- or alkyl-ammonium salts) as well as one or more basic tertiary N groups, and the C-atoms that are directly connected to the tertiary N-atoms should be aliphatic (preferably alkyl or alkylene groups). Suitable "co-chain lengthening agents" that have both acid and basic groups are, for example, the following compounds:

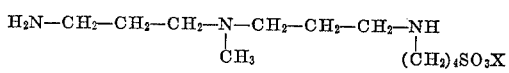

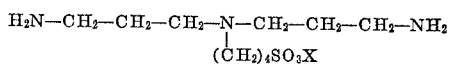

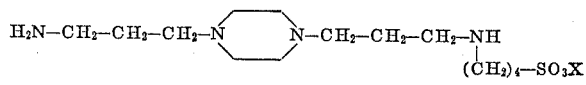

and

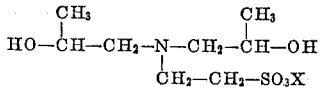

(X=H, alkali metal, (trialkyl)-ammonium radical).

It has been found that the presence of tertiary N-groups in the elastomers modified by acid groups eliminates the slightly increased tendency to discoloration on exposure to light brought about by the acid groups and produces an overall increase in the stability to discoloration.

The dyeability with acid and basic dyestuffs can equally well be achieved by reacting the co-chain lengthening agents having acid groups with NCO preadducts or chain lengthening agents which in turn contain tertiary N-groups. In these cases it is also possible, of course, to use the co-chain lengthening agents containing acid and tertiary N-groups.

The NCO prepolymers containing tertiary N-groups can be built up by reacting dialcohols which contain tertiary N-groups with the diisocyanates, either separately or together with the higher molecular weight polyhydroxyl compounds. Examples of compounds containing tertiary N-groups are bis-(β-hydroxyethyl)-methylamine, bis-(β - hydroxypropyl) - propylamine, N:N' - bis - (β-hydroxypropyl)-piperazine.

The incorporation of tertiary N-groups into the elastomers may alternatively be effected by using certain proportions of chain lengthening agents having one or more tertiary N-atoms, e.g. bis-(β-hydroxyethyl)-methyliamine, bis-(β - hydroxypropyl) - methylamine, bis - (β - hydroxyethyl)-piperazine, N-methylamino-bis-propylenediamine, N:N'-bis-(γ - propylamine) - piperazine, N:N' - dimethyl-N:N'-bis-(γ - propylamine) - ethylenediamine, N-methyl-amino-bis-propionic acid dihydrazide, ethylenediamine-N:N'-dimethyl-N:N'-bis-propionic acid hydrazide, piperazine-N:N'-bis-propionic acid hydrazide. Modification of the elastomer substance is also possible by addition of basic substances which contain tertiary N-groups and which may if desired subsequently be linked chemically to the elastomers through reactive ethylene imine, epoxy, methylol, or isocyanate groups or groups which split off isocyanate. Further, elastomer solutions which contain only tertiary N-groups may be mixed with the elastomer solutions of the invention which contain acid groups. Also in this process the presence of tertiary N-groups results in improved resistance to light.

To achieve adequate dyeability to acid dyestuffs, one may also use a quantity of substances containing tertiary N-groups for building up the elastomers such that the content of basic groups in the elastomers is about 25 to 400 milliequivalents of tertiary N per kg. of elastomer substance, preferably 40 to 300 mval. of tertiary N per kg.

Both for the acid and for the basic modification of the elastomers it is advisable to choose the content of tertiary N-groups always slightly higher than the content of acid (sulphone or disulphimide) groups, for example 50 mval. $SO_3^-$/kg. plus 75–100 mval. tertiary N/kg. of elastomer substance.

Fast dyes with deep colours can be obtained on such elastomer threads both with acid dyestuffs (e.g. Telonchromschwarz C or Supraminrot GG [C.I. Acid-Orange 14 690]) and with basic dyestuffs (e.g. Astrazonblau BG [C.I. Basic Blue 3 51 005]). Such elastomer fibres can therefore be dyed together with polyamides as well as with polyacrylonitrile fibres without having to select different elastomer types for each case.

The following examples illustrate more specifically the invention. The parts given in these examples are parts by weight.

Example 1

250 parts of a polyester (OH number 56) of adipic acid, hexane-1:6-diol and 2:2-dimethylpropane-1:3-diol (molar ratio 10:6.6:3.5) are melted to a clear melt at 80° C., reacted with stirring with 71.9 parts of 4:4'-diphenylmethane diisocyanate and kept at 75–80° C. for 45 minutes.

The melt consisting of the polyester-diisocyanate adduct and free diisocyanate is dissolved with intensive mixing in the quantity of dimethylformamide calculated to give the desired end concentration. At the same time, the selected quantity of co-chain lengthening agent dissolved in the calculated quantity of water and a small amount of dimethylformamide is added and the reaction temperature adjusted to 50° C.

After a few hours, the solution has the necessary viscosity for spinning. Any further reaction of the clear spinning solution is stopped by adding water in an excess of about 30% calculated on the free isocyanate groups in the polyester-diisocyanate adduct and cooling the solution to room temperature. If desired, the solution is pigmented by stirring titanium dioxide into it. The individual data are given in the following Table 1.

TABLE 1

| No. | Dimethylformamide (parts) | Co-chain lengthening agent | Quantity | Quantity of $H_2O$ added (parts) | Solids content (percent) | Quantity of $H_2O$ subsequently added (parts) | Titanium dioxide (parts) |
|---|---|---|---|---|---|---|---|
| a | 969 | $H_2N$-⟨⟩-⟨⟩-$NH_2$ with $LiO_3S$, $SO_3Li$ | 5.0 | 2.5 | 25 | 1.0 | |
| b | 867 | Same as above | 2.5 | 2.6 | 27 | 1.0 | |
| c | 860 | ...do... | 0.5 | 2.7 | 27 | 1.1 | |
| d | 867 | $H_2N$-⟨⟩-$CH_2$-$CH_2$-⟨⟩-$NH_2$ with $LiO_3S$, $SO_3Li$ | 2.5 | 2.6 | 27 | 1.1 | |
| e | 865 | $H_2N$-$(CH_2)_6$-$NH$-$(CH_2 / SO_3Li)_4$ | 2.5 | 2.5 | 27 | 1.0 | |
| f | 876 | Same as above | 1.25 | 2.6 | 27 | 1.0 | 4.8 |
| g | 860 | $H_2N$-$(CH_2)_2$-$NH$-$(CH_2 / SO_3Li)_4$ | 0.5 | 2.7 | 27 | 1.1 | |
| h | 860 | | | 2.5 | 27 | 1.3 | |

The solutions described in Table 1 were spun by known spinning processes into elastic filaments and the various elastomer filaments were tested for their affinity to basic dyestuffs by dyeing in the presence of polyacrylnitril fibres by the one bath process with a 3% Astrazonblau-B dye bath (C.I. Basic Blue 5; 42140) of pH=4 at 100° C. for 60 minutes. The quantity of dye taken up by both types of fibres was then determined colorimetrically as a measure for the dye affinity in mg./g. of fibre. The result is shown in Table 2 for elastomer filaments and for the accompanying polyacrylonitrile fibres in addition to the textile technological properties of elastomer filaments.

TABLE 2.—DYE AFFINITY AND TEXTILE TECHNOLOGICAL PROPERTIES OF THE ELASTOMER FILAMENTS OF THE INVENTION

| Soln. No. | Titre, den. | Tensile strength, g./den. | Elongation at break, percent | Permanent elongation, percent | 300% modulus, mg./den. | Quantity of dyestuff taken up | |
|---|---|---|---|---|---|---|---|
| | | | | | | Elastomer, mg./g. fibre | Dralon, mg./g. fibre |
| a | 420 | 0.81 | 540 | 8 | 200 | 22.0 | 10.8 |
| b | 420 | 0.78 | 560 | 10 | 180 | 13.7 | 10.3 |
| c | 420 | 0.85 | 520 | 10 | 160 | 5.1 | 10.0 |
| d | 140 | 1.00 | 520 | 9 | 180 | 20.0 | 10.5 |
| e | 140 | 0.95 | 520 | 10 | 180 | 5.0 | 8.5 |
| f | 140 | 0.92 | 530 | 9 | 180 | 5.7 | 9.5 |
| g | 140 | 0.76 | 560 | 10 | 150 | 5.0 | 10.0 |
| h | 140 | 1.00 | 540 | 10 | 170 | <0.5 | 8.8 |

Example 2

600 parts of a polyester of hexanediol, 2:2-dimethyl propane-1:3-diol and adipic acid (molar ratio of glycols 65:35; OH number=66; acid number=1.4) are heated with 149 parts of diphenylmethane-4:4′-diisocyanate and 187 parts of chlorobenzene to 90–98° C. for 50 minutes after one hour's dewatering at 130° C./12 mm. Hg and after deactivation with 1.2 parts of a 35% $SO_2$/dioxane solution. NCO content of the NCO preadduct after cooling to 20° C.=1.99%.

925 parts of cold dimethylformamide are added to a solution of 7.30 parts of piperazine-bispropylamine-N-butylsulphonic acid sodium and 7.34 parts of carbodihydrazide in 15 parts of hot distilled water, and a suspension of the diamine carbonate is formed by throwing about 10 parts of solid carbon dioxide into the mixture. 400 parts of the NCO preadduct described above are then introduced with vigorous stirring, the turbidity clearing up with evolution of $CO_2$ and a clear viscous elastomer solution of 134 poises/20° C. being obtained after briefly heating for 30 minutes to 75° C. After the addition of 0.56 parts of hexane-1:6-diisocyanate, the viscosity of the solution rises to 530 P/20° C.

By spinning into a heated spinning shaft through a spinneret of 16 apertures each of 0.20 mm. diameter, drawing off the filaments with a draw-off roller and winding onto spools under different preliminary stretching (preliminary stretching between roller and creel=0, 50 and 100%), elastomer filaments are obtained which have the following properties after thermofixation on spools (one hour at 130° C. in $N_2$ atmosphere):

| V | Titre, den. | Ts, g./den. | Elongation, percent | TS at break, g./den. | M 300, mg./den. | Permanent elongation (3×300% after 30 secs. release time) |
|---|---|---|---|---|---|---|
| 0 | 201 | 0.68 | 645 | 5.06 | 98 | 14 |
| 50 | 156 | 0.85 | 600 | 5.14 | 112 | 14 |
| 100 | 114 | 0.75 | 550 | 4.42 | 135 | 14 |

The elastomer substance contains about 61 mval. of —$SO_3^\ominus$/kg. and about 122 mval. of tertiary N/kg. (1 mval.=1 milliequivalent).

The filaments can be dyed with 2% Supraminrot GG (acid dyestuff) and with 2% Astrazonblau BG (basic dyestuff), to a deep red and deep blue colour respectively, the dye baths being quantitatively exhausted in each case. With 10% Telonchromschwarz C (chrome dye) the elastomer threads are dyed deep black throughout the thickness of the filament.

Elastomer filaments which, by way of comparison, have been produced with the use of only carbodihydrazide as chain lengthening agent can only be dyed very badly with the dyes described above. Instead of a black dye, for example, only a feeble brownish grey is obtained.

The piperazine-bis-propylamine-N-butyl sulphonic acid sodium used as co-chain lengthening agent is prepared as follows: 61.0 parts of butanesultone are added dropwise at boiling temperature to a solution of 270 parts of γ:γ′-diamino-propyl-piperazine in 450 ml. of i-propanol. After 2 hours boiling under reflux, the solvent and the excess γ:γ′-diamino-propyl-piperazine are distilled off.

The resinous piperazine-bis-propylamine-N-butylsulphonic acid is dissolved in 150 ml. of water and 18.0 parts of caustic soda and the solution evaporated to dryness in vacuo. The salt is dried over phosphorus pentoxide in vacuo for further dehydration.

Example 3

600 parts of the polyester described in Example 2 are heated with 149 parts of diphenylmethane-4:4′-diisocyanate and 321 parts of dioxane to 90 to 98° C. for 90 minutes. NCO content of the NCO preadduct after cooling = 1.86%.

0.741 part of γ:γ′-bis-(aminopropyl)-N-methylamino-γ-N′-(butyl-Na-sulphonate) and 1.25 parts of carbodihydrazide are dissolved hot in 132 parts of dimethylformamide and mixed, with stirring, with 75 parts of the above NCO preadduct solution. A highly viscous elastomer solution is formed (365P/20° C.).

The elastomer solution is painted on to glass plates and cut into threads after evaporation of the solvent (one hour/100° C.). These elastomer threads can be dyed to deep colours both with 2% Supraminrot GG (acid dyestuff) and 10% of Telonchromschwarz C (afterchroming dyestuff) as well as with 2% of Astrazonblau BG (basic dyestuff).

The elastomer substance in each case contains about 45 mval. $SO_3^-$/kg. and 45 mval. tertiary N/kg.

γ:γ′-Bis(aminopropyl)-N-methylamine-γ-N′-(butyl-Na-sulphonate) is prepared by the action of 136 parts of butanesultone on a solution of 300 parts of γ:γ′-diaminopropyl-N-methylamine in 700 ml. of i-propanol. After two hours' boiling under reflux, the solvent and the excess amine are distilled off. The crude sulphonic acid is dissolved in 250 ml. of water with addition of 40.0 parts of caustic soda. The aqueous solution of the Na salt is evaporated to dryness in vacuo. The Na salt has an equivalent weight of 102 (N/10 HCl against bromophenol blue), the calculated equivalent weight is 101.

Example 4

75 parts of the NCO preadduct described in Example 3 are introduced at room temperature into a suspension prepared from 0.75 part of γ:γ′-bis(aminopropyl)-N-methylamine-γ-N′-(butyl-Na-sulphonate) and 0.84 part of ethylene diamine and 130 parts of dimethylformamide and throwing in 5 parts of solid carbon dioxide, the turbidity disappearing with evolution of $CO_2$ and a colourless, clear elastomer solution (53 poises/20° C.) being obtained. After being worked up into films, filaments are cut from these films and dyed as in Example 3. The elastomer films modified with about 45 mval. of $SO_3^\ominus$ and 45 mval. of tertiary N/kg. of elastomer have good dyeability with the acid and basic dyestuffs described in Example 3. Melting point of the elastomer substance above 260° C. (becoming soft above 230° C.).

Example 5

107.5 parts of the NCO preadduct from Example 2 are stirred into a suspension prepared by dissolving 0.865 part of 1:6-hexanediamine-3-suphonic acid sodium and 2.02 parts of carbodihydrazide in 10 parts of hot water, filling up with 228 parts of dimethylformamide and adding about 5 parts of solid carbon dioxide. $CO_2$ is evolved and a clear slightly yellowish solution is formed from which elastomer filaments are produced which can be dyed well with basic dyestuffs (Astrazonblau BG) but not with acid dyestuffs.

Preparation of 1:6 - hexanediamine - 3 - sulphonic acid sodium: 145 parts of 1:4-dicyanobutane-2-sulphonic acid sodium are hydrogenated in the presence of 60 parts of Raney cobalt at 75–80° C. and 170 to 180 atmospheres after the addition of 95 ml. of liquid ammonia; reaction time 2 hours. After filtering off the catalyst, ammonia and methanol are distilled off. After being left to stand for some time, the at first resinous 1:6-hexanediamine-3-sulphonic acid sodium crystallises, when it has a melting point of 92° C. Equivalent weight calculated: 109. Found: 109.5.

$C_6H_{15}N_2O_3SNa$ (218.3). Calculated: N, 12.83; S, 14.69. Found: N, 12.21, S, 14.7.

Example 6

600 parts of the polyester described in Example 2 are heated to 90 to 98° C. for 35 minutes with 18 parts of bis-($\beta$-hydroxypropyl)-methylamine, 176 parts of diphenylmethane-4:4'-diisocyanate and 340 parts of chlorobenzene. (NCO content of the preadduct after cooling to room temperature=1.68%).

302 parts of the NCO preadduct solution prepared as described above are introduced with stirring into a solution of 3.71 parts of 4:4'-diamino-2:2'-disulphonic acid-dihydrostilbene sodium and 4.54 parts of carbodihydrazide in 564 parts of hot dimethylformamide. The highly viscous (380 poises/20° C.) elastomer solution obtained is pigmented with 16.3 parts of a 33% $TiO_2$/dimethylformamide paste and spun by the wet spinning process in water at 90° C. The elastomer filaments obtained can be dyed to deep colours both with acid dyestuffs (10% Telonchromschwarz C) and with basic dyestuffs (2% Astrazonblau BG).

The elastomer substance contains about 150 mval. tertiary N/kg. and about 80 mval. $SO_3^{\ominus}$/kg.

Example 7

300 parts of the polyester from Example 2 are reacted with 5.85 parts of bis-($\beta$-hydroxypropyl)-methylamine, 82.5 parts of diphenylmethane-4:4'-diisocyanate and 98 g. of chlorobenzene for 40 minutes at 90 to 98° C. (NCO content 1.91%).

2.56 parts of 4:4'-diamino-diphenyl-disulphonimide sodium

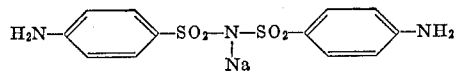

in 116 parts of dimethylformamide are heated to 60° C. for 10 minutes with 30 parts of the NCO preadduct solution and then treated with a solution of 1.54 parts of carbodihydrazide in 116 parts of dimethylformamide and 77.5 parts of the NCO preadduct solution are introduced into the mixture. The elastomer substance contains about 100 mval. tertiary N/kg. and about 45 mval. of $SO_2N.SO_2-$/kg.

Films cast from the elastomer solution are cut up into filaments (about 1000 den) and these are dyed with 2% Astrazonblau or 10% Telonchromschwarz.

Blue and deep black dyeings are obtained.

Example 8

300 parts of a polytetramethyleneetherdiol (OH number 68) are heated in a boiling water bath for 40 minutes with 75 parts of diphenylmethane-4'4'-diisocyanate and 160 parts of chlorobenzene. NCO content=1.81%.

2.46 parts of the sodium salt of 4:4'-bis-semicarbazide-dihydrostilbene-2:2'-disulphonic acid and 1.66 parts of carbodihydrazide are dissolved in 10 parts of water and 254 parts of dimethylformamide and treated with 102 parts of the above NCO preadduct solution with stirring, a highly viscous colourless elastomer solution being formed. Elastomer filaments from this elastomer solution can be dyed very satisfactorily with basic dyestuffs (2% Astrazonblau BG). The content of $SO_3^-$-groups in the elastomer is about 125 mval. of $SO_3^{\ominus}$/kg.

PREPARATION OF THE BIS-SEMICARBAZIDE 65.6 parts of the bis-phenylurethane of 4:4'-diaminodihydrostilbene-2:2-disulphonic acid sodium are introduced into 100 parts of hydrazine hydrate at 60° C., 90 ml. of water are added and the reaction mixture is kept at 75° C. for one hour. 4:4'-bis-semicarbazide-dihydrostilbene-disulphonic acid sodium which crystallises out on cooling is filtered off with suction, washed with isopropanol and recrystallised from 2 ml. of water per g., yield 76%.

$C_{16}H_{18}N_6Na_2O_8S_2$ (532.5) Calculated: N, 15.78; S, 12.04. Found: N, 15.75; S, 11.7.

Example 9

250 parts of the polyester (OH number 56) described in Example 1 are heated to 100 to 105° C. for one hour with 77.5 parts of 4:4'-diphenylmethane-diisocyanate after one hour's dewatering at 100° C./12 mm. Hg. A solution of 40 parts of 1:5 naphthylene-bis-$\beta$-hydroxyethyl-ether, 1.25 parts of 4:4'-diamino-diphenyl-disulphonic acid lithium and 0.75 part of endoethylene-piperazine in 1103 parts of dimethyl formamide is then added to the reaction mixture, the temperature thereby dropping to 50 to 54° C. The mixture is kept at 50° C. for 30 minutes and then cooled to 10–15° C. After a few hours, a viscous elastomer solution of 150 poises/20° C. is obtained.

By spinning this solution into an aqueous precipitation bath through multi-apertured spinnerets, elastic filaments are obtained which can be dyed to deep and brilliant colours with basic dyestuffs such as Astrazonblau 3 RL (C.I. Basic Blue 47, p. 174) and Astrazonblau RL (C.I. Basic Blue 46, p. 173, second edition [1952]) from a 1% and 6% dye bath respectively.

Example 10

250 parts of the polyester described in Example 1 (OH number 56) are heated to 93–95° C. for one hour with 62.5 parts of 4:4'-diphenylmethane-diisocyanate and 78 parts of chlorobenzene after one hour's dewatering at 100°/12 mm. Hg. When cooled to room temperature, the preadduct having free NCO groups is diluted with 173 parts of dimethylformamide and slowly introduced at 20 to 25° C., with vigorous stirring, into a solution of 6.8 parts of hydrazine hydrate and 0.5 part of 4:4'-diamino-diphenyl-2:2'-disulphonic acid lithium in 700 parts of dimethylformamide. A viscous elastomer solution having a viscosity of 140 poises/20° C. is obtained.

The elastomer filaments obtained by the wet spinning process can be dyed to deep colours with basic dyestuffs such as Astrazonblau 3 RL and Astrazonrot RL (C.I. Basic Red 25) from a 1% dyebath.

Example 11

150 parts of a 1,6-hexanediol/2,2-dimethyl-propanediol-1,3/adipic acid-polyester (molar ratio of the glycols 65/35; OH-number 68,0, acid-number 1,5) are dewatered at 130° C./12 torr (1 hour), deactivated by addition of 0.2 part of solution of 33% $SO_2$ in dioxane and reacted with 42 parts of diphenylmethan-4,4'-diisocyanate at 100° C. during 45 minutes. The melt is mixed with 150 parts of dioxane, the resulting NCO-adduct solution contains 1.83% NCO after cooling to room-temperature.

A solution of 0.56 part m-xylylendiamin-sulfamid-acid

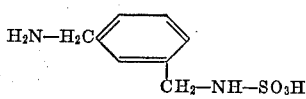

in 26.0 ml. of n/10 sodium-hydroxide-solution is added to a solution of 4.00 parts of carbohydrazide in 340 parts of dimethyl formamide 200 parts of the NCO-adduct-solution is added to this solution of the chain extending agents with intensive stirring of the mixture.

The highly viscous solution of the elastomer is transformed to films on glass-plates, the solvent being removed by heating 1 hour at 100° C.

The films show the following properties:

| | |
|---|---|
| Thickness (mm.) | 0.15 |
| Tensile strength (kg./cm.$^2$) | 618 |
| Elongation at break (percent) | 600 |
| Modulus at 20% elongation (kg./cm.$^2$) | 18 |
| Modulus at 300% elongation (kg./cm.$^2$) | 147 |
| Tear strength (kg./cm.) | 47 |
| Micro-hardness | 70 |

After cutting the films to filaments, these filaments show the following properties:

| | |
|---|---|
| Titre (den) | 576 |
| Tensile strength (g./den) | 0.44 |
| Elongation at break (percent) | 570 |
| Tensile strength (referring to the titre at break) | 3.0 |
| Modulus at 300% elongation | 82 |
| Permanent elongation after 3-cycles between 0 and 300% elongation, 30″ after the third cycle | 19 |

The elastomer substance contains about 22 milliequivalents of $SO_3^-$ per kg. The filaments can be dyed with 2% C.I. Basic Blue 3; C.I. Nr. 5.1005) in deep shades. The m-xylylene-diamine is heated with 50 parts of amidosulfonic acid within 30 minutes to 160° C. and further 90 minutes whilst splitting off ammonia. The unreacted m-xylylene-diamine is extracted with ether, the crude sulfonic acid is recrystallised from water. Yield 70%, melting point 278–280° C. $C_8H_{12}N_2SO_3$ (216.3). The analysis gives the following results: C, 44.43; H, 5.59; N, 12.96; O, 22.20; S, 14.83. C, 44.30; H, 5.57; N, 13.01; O, 22.20; S, 14.80.

Example 12

150 parts of dewatered and deactivated polyester of Example 11 are heated over a period of 50 minutes at 100° C. with 40.8 parts of diphenylmethane-4,4′-diisocyanate.

After dissolving the melt in 150 parts of dioxan, the NCO-content of the NCO-adduct-solution is 1.73%. 0.60 part of the ammonium-salt of 4,4′-diamine-dibenzyl-2,2′-disulfonic acid in 10 parts of water are mixed with a solution of 1.88 parts of carbohydrazide in 160 parts of dimethylformamid.

100 parts of NCO-adduct solution is added to the solution of the chain extending agents at 25–30° C. By addition of 6 parts of a 2.5% solution of 1,6-hexane-diisocyanate in dioxan the viscosity of the elastomer solution rises to 300 poise/20° C.

Instead of 0.60 part of the above described ammonium salt there can be used with the same effect a solution of 0.51 part of 4,4′-diamino-dibenzyl-2,2′-disulfonic acid and 0.29 part of diethanolamine in 10 parts of water. The elastomer solutions are transformed into films and these are cut to filaments (as shown in Example 11). The filaments can be dyed with 2% C.I. Basic Blue 3, C.I. Nr. 51005 in deep shades. The elastomer contains 46.5 milliequivalents of $SO_3^\ominus$ per kg. elastomer substance.

What we claim is:

1. A polyurethane elastic filament prepared by (1) reacting at a temperature below about 150° C. (i) a substantially linear polyhydroxy compound having a molecular weight between about 800 and about 3,200 and a melting point below 60° C. with (ii) an excess of an organic diisocyanate to prepare an —NCO terminated prepolymer; (2) dissolving the prepolymer of step (1) in a solvent which will dissolve polyacrylonitrile and reacting said prepolymer at a temperature between about −10° C. and about 100° C. with from 80% to 130%, based on the free —NCO groups in said prepolymer, with an extender system comprising (a) 50 to 98 mol percent of a difunctional chain extender having a molecular weight below about 500 and (b) 2 to 50 mol percent of a difunctional —$SO_3^\ominus$ group containing or —$SO_2$—$N^\ominus SO_2$— group containing co-chain extender having the formula:

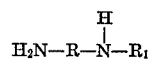

or an alkali metal salt thereof, wherein R is selected from the groups consisting of (i) a diphenylene-disulfonic acid group, (ii) a piperazine-di-N-alkylene group, (iii) an alkylene group having 2 to 8 carbon atoms, (iv) a

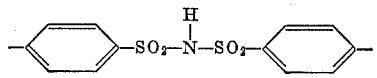

group, and, (v) a

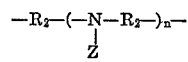

group, wherein $R_2$ is an alkylene group having 2 to 8 carbon atoms; wherein Z is selected from the group consisting of an alkyl group and an alkyl sulfonic acid group; wherein n is an integer of 1 or 2; and wherein $R_1$ is selected from the group consisting of hydrogen, an alkyl-sulfonic acid group, and an alkyl group having 2 to 8 carbon atoms; to form a polyurethane, said (b) being present in such quantities such that the polyurethane contains between about 2 to 300 milliequivalents/kg. of polyurethane of —$SO_3^\ominus$ groups or —$SO_2$—$N^\ominus$—$SO_2$— groups; and (3) thereafter spinning said filament.

2. The elastic filaments of claim 1, in which said linear polyhydroxyl compound is a polyester of an aliphatic diol and adipic acid, having a melting point of below 60° C. and a molecular weight of 800 to 3200.

3. The elastic filaments of claim 2 in which said linear polyhydroxyl compound is a polytetramethylene ether diol, having a molecular weight of 800 to 3200.

4. The elastic filament of claim 1, wherein said diisocyanate is a symmetrical aromatic diisocyanate.

5. The elastic filament of claim 1, wherein said co-chain extending agent is an alkali-salt of an alkylene-diamine-N-butyl-sulfonic acid.

6. The elastic filament of claim 1, wherein said co-chain extending agent is an alkali-salt of ethylene-diamine-N-butyl-sulfonic acid.

7. The elastic filament of claim 1, wherein said co-chain extending agent is an alkali-salt of a diamino aryl-disulfonic acid.

8. The elastic filament of claim 1, wherein said co-chain extending agent is an alkali-salt of 4,4′-diaminodiphenyl-2,2′-disulfonic acid.

9. The elastic filament of claim 1, wherein said co-chain extending agent is an alkali salt of the piperazine-bis-propylamino-N-butyl sulfonic acid.

10. The elastic filament of claim 1, wherein said co-chain extending agent is an alkali salt of the γ,γ-bis-(aminopropyl)-N-methylamino-γ-N-butyl sulfonic acid.

11. The elastic filament of claim 1, wherein said co-chain extending agent is an alkali salt of 4,4′-diamino-diphenyl-disulfonimide.

12. The elastic filament of claim 1, wherein said segmented polyurethane elastomer contains tertiary aliphatic nitrogen groups in an amount of 20 to 400 milliequivalents of tertiary N/kg. of the polyurethane elastomer.

(References on following page)

References Cited

UNITED STATES PATENTS

| | | | |
|---|---|---|---|
| 2,929,804 | 3/1960 | Steuber | 260—77.5 |
| 3,066,158 | 11/1962 | Sayigh | 260—397.7 |
| 3,184,502 | 5/1965 | Muller et al. | 260—482 |
| 3,294,752 | 12/1966 | Wilkinson | 260—77.5 |
| 3,305,533 | 2/1967 | Thoma et al. | 260—75 |

FOREIGN PATENTS

| | | |
|---|---|---|
| 206,750 | 8/1966 | Sweden. |
| 734,965 | 5/1966 | Canada. |
| 827,745 | 2/1960 | Great Britain. |
| 1,223,154 | 8/1966 | Germany. |

DONALD E. CZAJA, *Primary Examiner.*

F. McKELVEY, *Assistant Examiner.*